(12) United States Patent
Jo et al.

(10) Patent No.: US 8,504,080 B2
(45) Date of Patent: Aug. 6, 2013

(54) USER INTERFACE FOR CREATING MULTIMEDIA MESSAGE OF MOBILE COMMUNICATION TERMINAL AND METHOD THEREOF

(75) Inventors: Jang Hyeon Jo, Gyeonggi-Do (KR); Jong Kwan Yoon, Seoul (KR); Ji Youn Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1917 days.

(21) Appl. No.: 10/856,666

(22) Filed: May 28, 2004

(65) Prior Publication Data

US 2005/0136953 A1 Jun. 23, 2005

(30) Foreign Application Priority Data

Dec. 18, 2003 (KR) .................. 10-2003-0093334

(51) Int. Cl.
*H04W 4/00* (2009.01)

(52) U.S. Cl.
USPC ........................................................ 455/466

(58) Field of Classification Search
USPC ............. 370/328, 349; 455/466, 414.1, 566; 715/810, 828, 829
See application file for complete search history.

(56) References Cited

U.S. PATENT DOCUMENTS

| | | | | |
|---|---|---|---|---|
| 6,167,255 | A * | 12/2000 | Kennedy et al. | 455/414.1 |
| 6,396,813 | B1 * | 5/2002 | Glass et al. | 370/252 |
| 6,466,202 | B1 * | 10/2002 | Suso et al. | 345/169 |
| 6,570,596 | B2 * | 5/2003 | Frederiksen | 715/808 |
| 6,580,917 | B1 * | 6/2003 | Lefevre et al. | 455/466 |
| 6,910,179 | B1 * | 6/2005 | Pennell et al. | 715/207 |
| 7,099,920 | B1 * | 8/2006 | Kojima et al. | 709/206 |
| 7,113,911 | B2 * | 9/2006 | Hinde et al. | 704/270.1 |
| 7,302,254 | B2 * | 11/2007 | Valloppillil | 455/414.1 |
| 7,418,670 | B2 * | 8/2008 | Goldsmith | 715/810 |
| 7,512,400 | B2 * | 3/2009 | Starbuck et al. | 455/414.1 |
| 2002/0077121 | A1 * | 6/2002 | Ketola | 455/456 |
| 2002/0102969 | A1 * | 8/2002 | Enns et al. | 455/414 |
| 2002/0110116 | A1 * | 8/2002 | Aaltonen | 370/352 |
| 2002/0112005 | A1 * | 8/2002 | Namias | 709/206 |
| 2003/0140103 | A1 * | 7/2003 | Szeto et al. | 709/206 |
| 2003/0167279 | A1 * | 9/2003 | Smiga et al. | 707/102 |
| 2003/0224832 | A1 * | 12/2003 | King et al. | 455/566 |
| 2004/0006474 | A1 * | 1/2004 | Gong et al. | 704/270.1 |
| 2004/0119732 | A1 * | 6/2004 | Grossman et al. | 345/708 |
| 2005/0010607 | A1 * | 1/2005 | Parker et al. | 707/200 |
| 2005/0055639 | A1 * | 3/2005 | Fogg | 715/535 |
| 2005/0096071 | A1 * | 5/2005 | Lin et al. | 455/466 |
| 2005/0149854 | A1 * | 7/2005 | Pennell et al. | 715/507 |
| 2005/0177621 | A1 * | 8/2005 | Moody et al. | 709/206 |
| 2006/0128367 | A1 * | 6/2006 | Vanhatalo | 455/418 |
| 2007/0041370 | A1 * | 2/2007 | Cleveland | 370/352 |

OTHER PUBLICATIONS

Outlook 2003 screenshots. Printed Jun. 20, 2010.*

* cited by examiner

*Primary Examiner* — Nathan Mitchell
(74) *Attorney, Agent, or Firm* — Lee, Hong, Degerman, Kang & Waimey

(57) ABSTRACT

A user interface method for creating a multimedia message of a mobile communication terminal is disclosed in which menu fields for creating a multimedia message are displayed in one screen, and when inputting content for each menu field is completed, it is automatically switched to a multimedia message-creating screen in which a selecting bar is positioned at the next field. In addition, while a user is using a multimedia function, a current image can be switched to the multimedia message-creating screen according to a user's need. Thus, the number of user's key manipulations can be reduced in creating the multimedia message, thereby enhancing a user's convenience.

40 Claims, 11 Drawing Sheets

USER INTERFACE FOR CREATING
MULTIMEDIA MESSAGE OF MOBILE
COMMUNICATION TERMINAL AND
METHOD THEREOF

CROSS REFERENCE TO RELATED
APPLICATIONS

Pursuant to 35 U.S.C. §119(a), this application claims the benefit of earlier filing date and right of priority to the Korean Patent Application No. 2003-93334, filed on Dec. 18, 2003, the content of which is hereby incorporated by reference in its entirety.

BACKGROUND OF THE INVENTION

1. Field of the Invention

The present invention relates to a user interface method of a mobile communication terminal and, more particularly, to a user interface method for efficiently creating a multimedia message in a mobile communication terminal.

2. Description of the Related Art

Currently, many types of mobile communication terminals implement diverse multimedia functions such as MP3 (MPEG layer 3) reproduction, a photographic capabilities, PDA (Personal Digital Assistant) functions, etc. Also, many types of terminals provide a multimedia message service (MMS) in which a short message can be transmitted together with a media file attached thereto.

The MMS is an enhanced message service that can transmit various images, melodies and voices as well as text messages.

Utilizing a user interface (UI) of an SMS (Short Message Service)-based mobile communication, the MMS of a conventional mobile communication terminal is implemented so that a user may attach contents stored in a media-holding box of the mobile communication terminal to a text message. However, a user must navigate through several menus and iterations in order to perform such a task.

In a MMS of a conventional mobile communication terminal, a message is first created by using a user interface, such as an SMS interface or a file management interface. After the message is created, a file attachment (multimedia file attachment) menu provided in a short message menu must be selected each time, which may create difficulties due to the increased number of key manipulations required by the user. Accordingly, a user's convenience in utilizing a conventional terminal is reduced.

SUMMARY OF THE INVENTION

Accordingly, the present invention is directed to a system and method for transmitting data via a mobile communication terminal that substantially obviates one or more problems due to limitations and disadvantages of the related art above.

An object of the present invention is to provide a user interface method for creating a multimedia message of a mobile communication terminal in consideration of a user's convenience.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve at least the above objects in whole or in parts, there is provided a mobile communication terminal comprising a user interface for creating a multimedia message in a multimedia message-creating screen that displays a plurality of menu fields, wherein, upon completion of inputting content in a first menu field, a second menu field is automatically selected in the multimedia message-creating screen.

Also, there is provided a method for creating and sending a multimedia message in a mobile communication terminal via a user interface, the method comprising the steps of: selecting a multimedia message-creating screen from a main menu; selecting a first menu field from plurality of sequentially arranged menu fields in the message-creating screen; inputting content in the first menu field; returning to the message-creating screen upon completion of inputting content in the first menu field, wherein a second menu field among the plurality of sequentially arranged menu fields is automatically selected; and transmitting the multimedia message upon completion of creating the multimedia message.

According to one aspect of the present invention, the method may further comprise the step of previewing the multimedia message prior to transmitting the message. Also, the multimedia message-creating screen may comprise a field to input contact information of a recipient designated to receive the multimedia message; a field to input a subject of the multimedia message; a field to input text, which comprises a body of the message; and a field to attach an image.

According to another aspect of the present invention, the step of inputting content in the first menu field may comprise selecting content from at least one content file previously stored in an internal memory of the mobile communication terminal. In addition to or alternatively, content may be manually inputted or generated.

It is to be understood that both the foregoing general description and the following detailed description are exemplary and explanatory and are intended to further describe the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention. In the drawings.

Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Reference will now be made in detail to one or more embodiments of the invention, examples of which are illustrated in the accompanying drawings.

Figure 1:
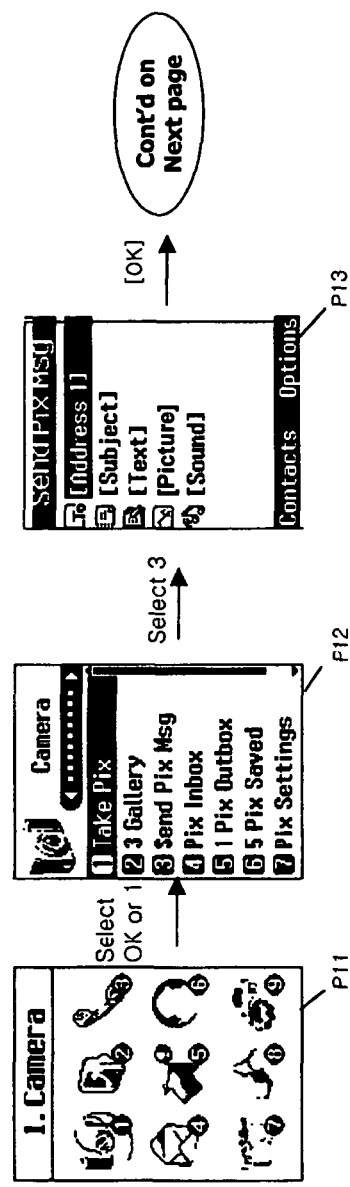
FIG. 1 is an exemplary view showing a menu-selecting image for creating a multimedia message in accordance with an embodiment of the present invention.

FIG. 1 is an exemplary view showing a menu-selecting image for creating a multimedia message in accordance with an embodiment of the present invention. For example, when a user selects an icon indicated by "1" from several icons included in a main menu (P11), a screen of the main menu is shifted to a menu related to photography, such as listing functions involving a camera integrated into the terminal. The menu concerning photography (P12) allows a user to select photo and multimedia message transmission. In selecting function number "3" (Send Pix Msg) in the menu (P12), various menu fields required for creating a multimedia message are displayed on a subsequent screen (P13). The list of available functions in the message transmission menu (P13) may be specific to the terminal's capability and can be customized by the user, wherein two sub-menus may also be included.

Figure 2:
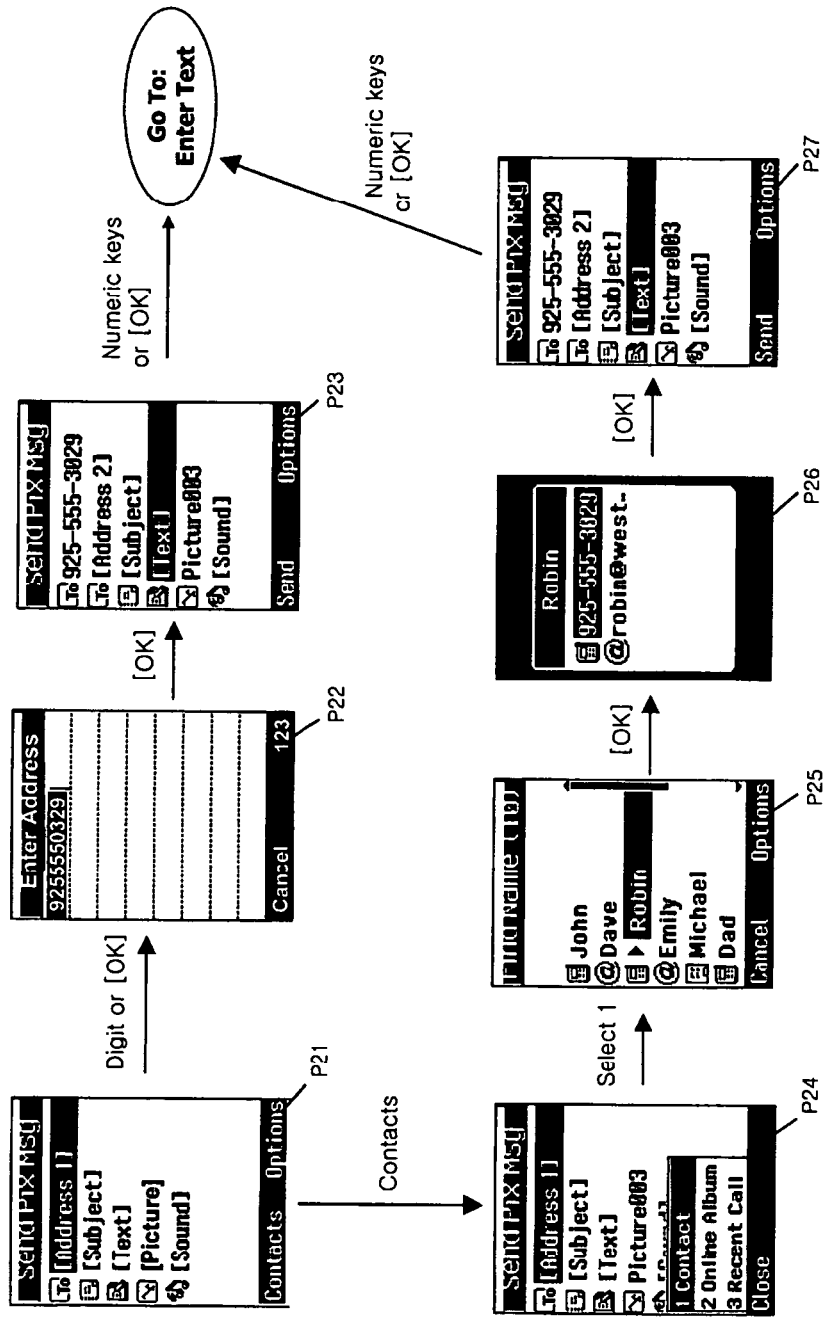
FIG. 2 is a first exemplary view showing detailed images for inputting an address in an address field of the multimedia message of FIG. 1.

FIG. 2 is a first exemplary view showing detailed images for inputting an address in an address field of the multimedia message of FIG. 1. In a menu field screen (P21) that displays various fields required for creating the multimedia messages, a user may select a field number designating a function through, for example, one or more key manipulations or toggle a pointing device or keys that move a selecting bar, and then pressing an "OK" or "ENTER" key. Upon selecting the desired function, the menu field screen (P21) may be replaced by an input screen (P22) that corresponds to the function selected in the menu field screen (P21).

For example, when a user selects an address field (Address 1) in the menu field screen (P21), an input screen (P22) appears and allows the user to directly input contact information such as a telephone number or an e-mail address. After the user inputs the contact information and engages a continuation key, such as pressing an "OK" key, the input screen (P22) is switched to the menu field screen (P23), which is updated and includes the location to which the file is being sent (i.e., the inputted telephone number). The user may then continue to select corresponding input fields in the menu field screen (P23), such as inputting text for the message body.

Furthermore, a user may alternatively, or in addition to, opt it insert contact information from a sub-menu, wherein contact information is extracted from stored data menus such as, for example, contact, online album, recent call, or the like. As exemplified in the menu field screen (P24), contact information is to be extracted by selecting a "Contact" menu, wherein a list of contacts is stored or registered in a phone book of the mobile communication terminal (P25). For example, if the user selects the arbitrary contact "Robin" from the contact list, an information screen that lists contact information (a phone number or an e-mail address) corresponding to the contact "Robin" is displayed (P26).

If the user selects the phone number displayed in the information screen (P26), the menu field screen (P27) appears, in which the selected phone number is inputted to the address field and the selecting bar is positioned at a next field to the address field or another.

A user may alternatively select "2 Online Album" from the contact information sub-menu, wherein an online album allocated to the mobile communication terminal is inputted to the address field. The online album comprises a wireless Internet service provided through the mobile communication terminal. The online album, which can store photos or images the user desires to register for a prescribed capacity, is allocated to every mobile communication terminal.

If the user selects, for example, "3 Recent Call" from the contact information sub-menu, a list of phone numbers with which the mobile communication terminal has received and/or made calls are displayed, and when an arbitrary phone number on the list is selected, the selected phone number is inputted in the address field.

Figure 3:
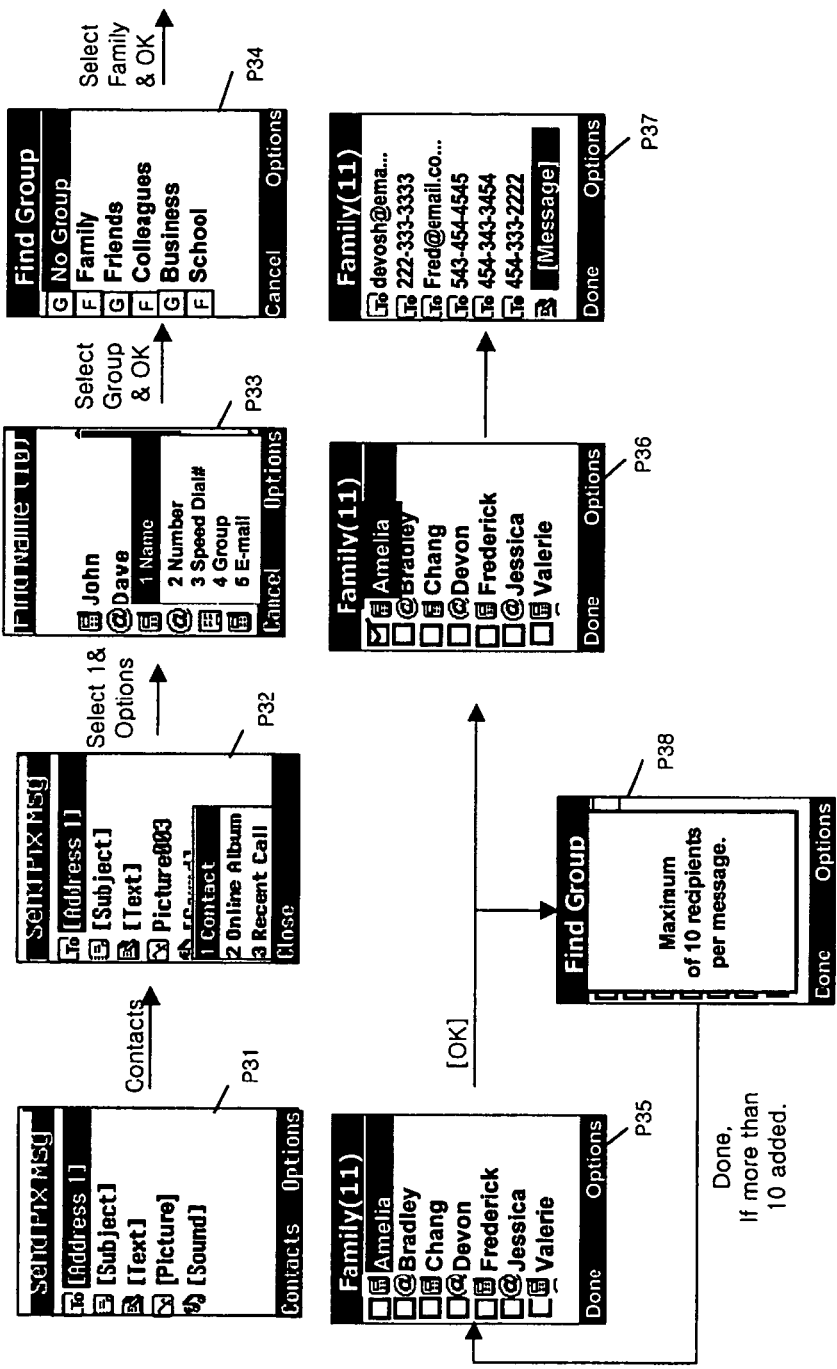
FIG. 3 is a second exemplary view showing detailed images for inputting an address in the address field of the multimedia message of FIG. 1.

Referring to FIG. 3, an exemplary view illustrates detailed images for inputting contact information such as an address in the address field of the multimedia message of FIG. 1. In the menu field screen (P31), a user selects the address field, wherein a contact information sub-menu appears (P32). Upon selecting "1 Contact", a list of contacts is stored or registered in a phone book of the mobile communication terminal (P33) appears. Should the user select "Group" from an arbitrary contact, designated group names (P34) appear from which a list of contacts classified under each group name can be selected.

For example, if the user selects "Family," a contact list registered for "Family" is displayed (P35). Furthermore, each contact from the aforementioned list may include a check box, wherein multiple recipients may be selected to receive the message (P36). After the user selects the recipient(s) of the multimedia message, contact information of the recipient(s) is displayed (P37). The terminal may also limit the number of contacts selected, such as "10 recipients" (P38), to which the message is sent.

Figure 4:
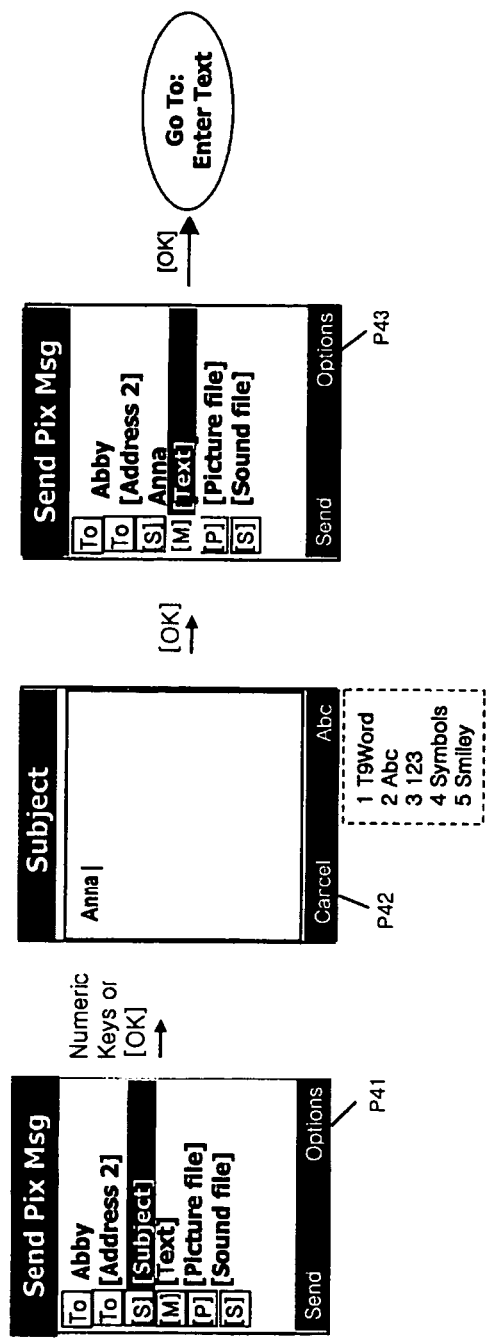
FIG. 4 is an exemplary view showing detailed images for inputting a subject in a subject field of the multimedia message of FIG. 1.

In FIG. 4, a user inputs a subject in the [Subject] field of the multimedia message by selecting the [Subject] function in the menu field screen (P41), wherein a subject inputting screen is displayed (P42). In the subject-inputting screen (P42), the user inputs a subject of the multimedia message by pressing one or more keys. Furthermore, a type selection menu may be available and indicated on the inputting screen (P42) so as to not interfere with the input of text for the subject. For example, at a lower end of the subject-inputting screen, a type selection menu for selecting types of inputting characters (T9Word, Abc, 123, Symbols, etc.) is located. After the user inputs the subject and manipulates the terminal to continue with the message transmission operation, such as pressing the "OK" key, for example, menu field screen (P43) appears. Alternatively, the user may input the subject via voice input. Preferably, the menu selection bar, which highlights the menu functions, is positioned at a next field to the subject field or another. Also, if the user does not input a subject in the subject field, generally, a portion (e.g., a first part) of the message content is preferably inputted in the text field is displayed in the subject field.

Figure 5:
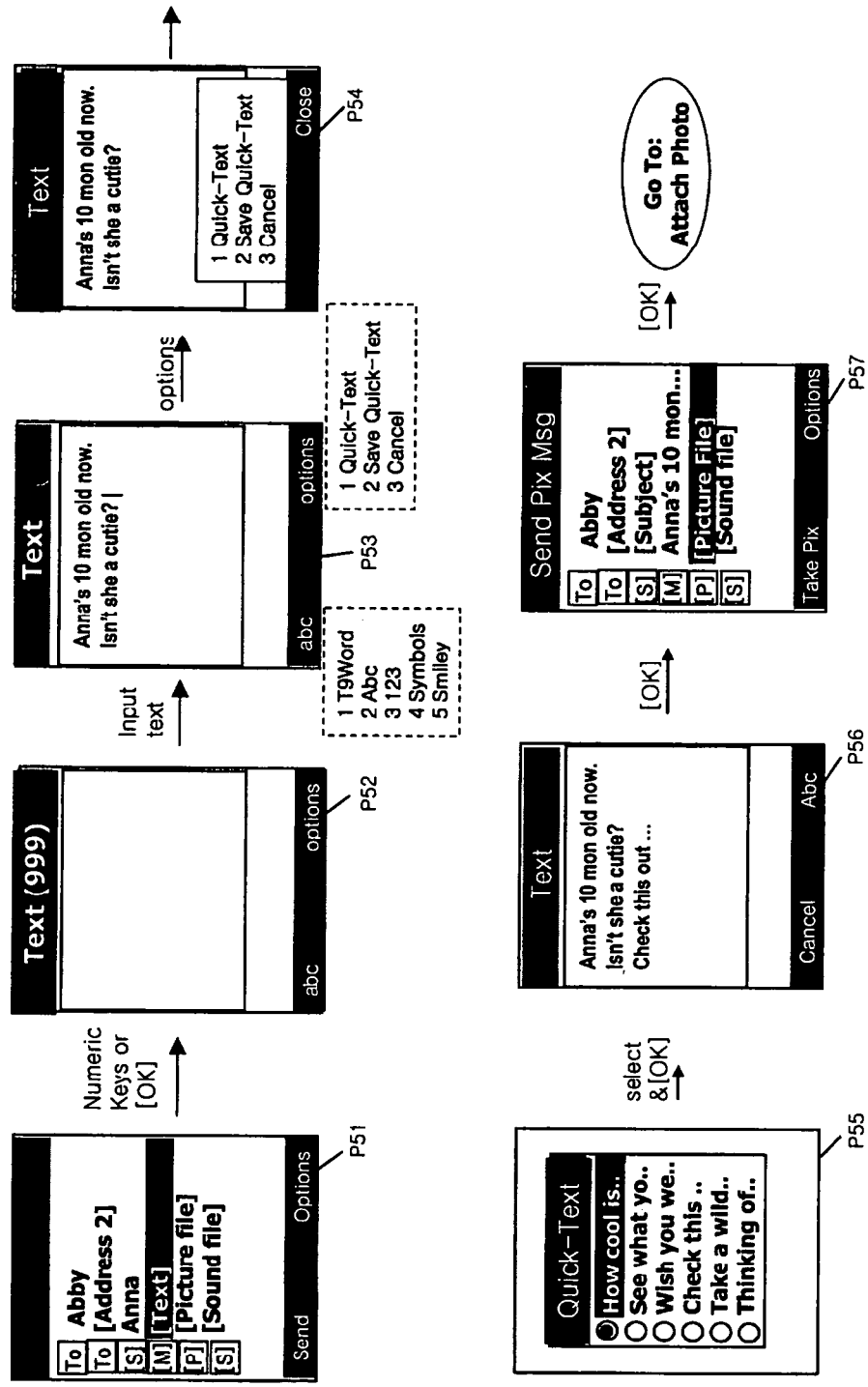
FIG. 5 is an exemplary view showing detailed images for inputting a text in a text field of the multimedia message of FIG. 1.

FIG. 5 is an exemplary view showing detailed images for inputting text in a text field of the multimedia message of FIG.

1. Upon selecting the [Text] field in the menu field screen (P51), a text input screen is displayed (P52), wherein the user inputs text by, for example, key manipulation (P53), voice input, or other method of input well known to one of ordinary skill in the art. Also, a type selection menu for selecting types of inputting characters (T9Word, Abc, 123, Symbols, etc.) is preferably located at a lower end of the text input screen. Furthermore, an "Options" menu is preferably provided for selecting a previously registered common phrase (Quick-Text) or for registering a common phrase. For example, if the user selects the "Options" menu, a sub-menu appears (P54). If the user selects "1 Quick-Text" to select a common phrase, a common phrase list registered in the mobile communication terminal is displayed (P55). When the user selects and enters a common phrase, the selected common phrase is displayed in the text input screen (P56). Upon completion of inputting text, the menu field screen (P57) appears, in which the selection bar is preferably positioned at a field following the text field. If the user inputs text into the text input screen and selects "2 Save Quick-Text," the user-inputted text is registered on the common phrase list.

Figure 6:
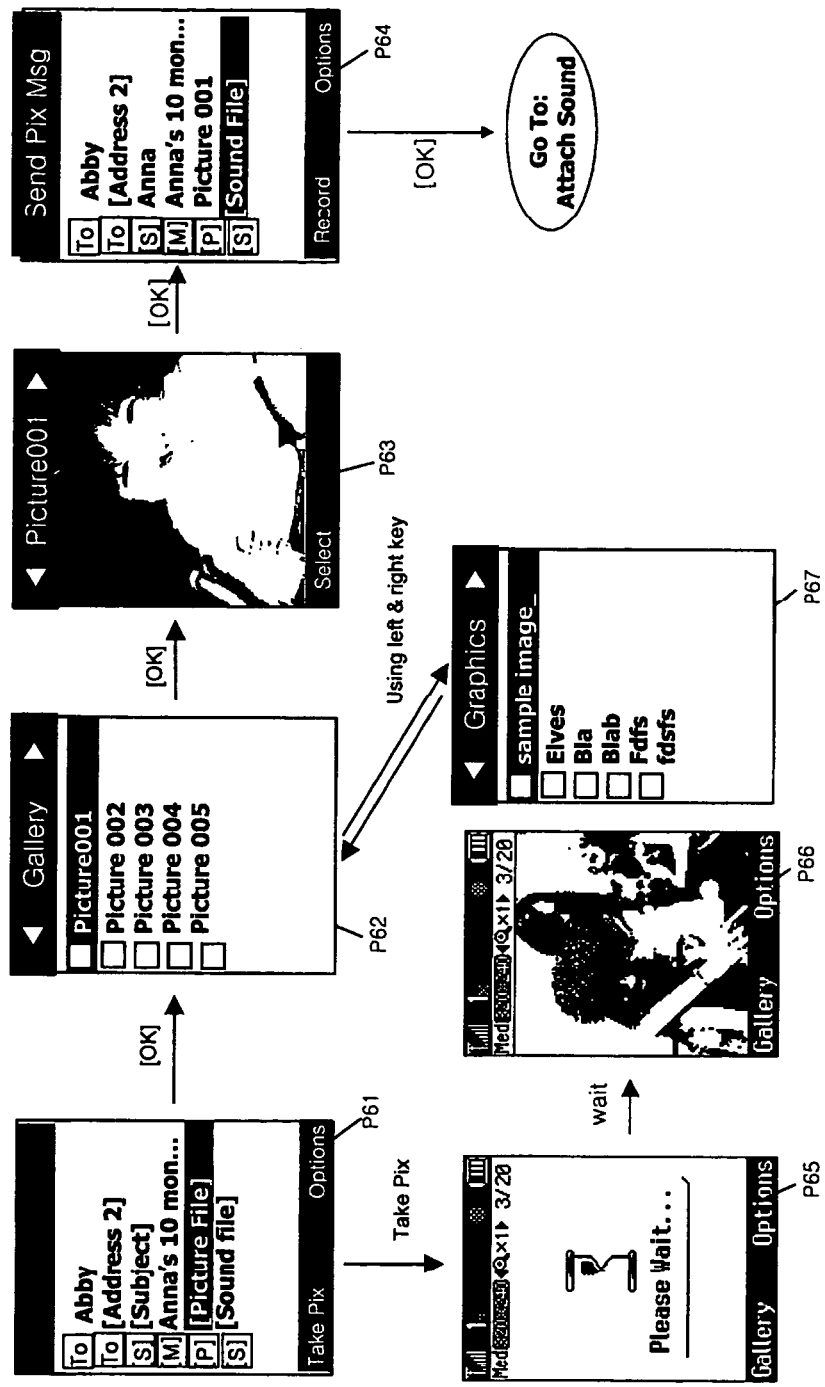
FIG. 6 is an exemplary view showing detailed images for attaching a photo to the multimedia message of FIG. 1.

FIG. 6 is an exemplary view showing detailed images for attaching a photo to the multimedia message of FIG. 1. If the user selects a [Picture File] (or graphics file) field in the menu field screen (P61), a title list of photographs (or graphics) stored in the mobile communication terminal is displayed (P62). When the user selects any one of them, the selected file or files is or are displayed (P63), wherein the user can check each image by using a direction key, for example. The user may attach desired images by manipulating the "Select" function, exemplified here as a "smart key" button on the screen. After completing the selection process, the menu field screen (P64) appears, wherein the image file to be transmitted is shown in the "Picture File" field.

The user may select one or more graphic files from a graphic file list to attach as well as photographs stored in the mobile communication terminal. Furthermore, if the photograph to be attached is not stored in the mobile communication terminal, a photograph can be generated by using the camera integrated in the mobile communication terminal and subsequently attached. Namely, when the user selects the "Take Pix" menu function in the menu field screen, the terminal initiates a photograph operation mode, so that the user can photograph an image and attach it (P65, P66, and P67).

Figure 7:
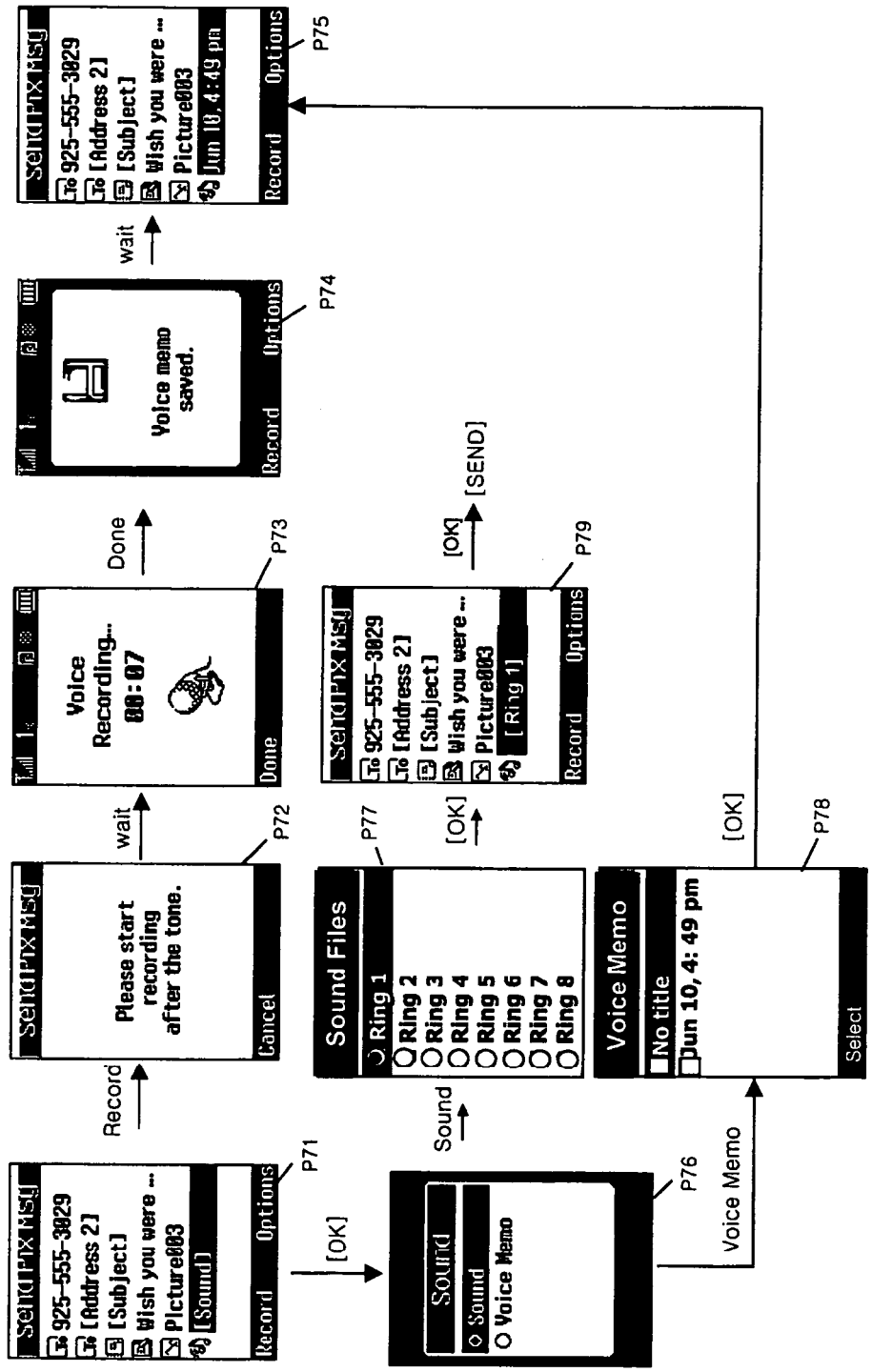
FIG. 7 is an exemplary view showing detailed images for attaching a sound to the multimedia message of FIG. 1.

FIG. 7 is an exemplary view showing detailed images for attaching a sound file to the multimedia message of FIG. 1. In a state where the selection bar is positioned on the [Sound] menu function in the menu field screen (P71), the user selects a "Record" key, exemplified here as a "smart-key" shown at the lower end of the screen. Consequently, the menu field screen is switched to a screen in which sound can be directly recorded (P72). The sound, which has a prescribed recording time (P73), is stored as a voice memo (P74) and is subsequently attached to the [Sound] field (P75). The recorded voice memo can be automatically stored at the same time of being attached to the multimedia message, or the user can alternatively set it so that the user is asked whether the voice memo is to be stored.

If the user seeks to attach a previously recorded voice memo or a stored sound file, without recording a sound, the user proceeds with the function by, for example, pressing the "OK" "smart-key" in the menu field screen. A screen for selecting types of sounds to be attached appears (P76). Upon selecting the type of sound to be attached to the message, a list of the sound files stored in the mobile communication terminal is displayed (P77). If the user selects "Voice Memo" in screen P76, a voice memo list stored in the mobile communication terminal is displayed (P78). The user then selects the sound file or the voice memo stored in the mobile communication terminal and manipulates the terminal, such as pressing the "OK" key, to attach the corresponding sound file to the sound field in the menu field screen (P79).

After checking whether each contents of the menu fields has been inputted properly, the user may then transmit the multimedia message created according to an embodiment of the present invention, by pressing the "Send" key, for example. Should the transmission of the multimedia message fail due to a bad communication situation or the like, the message can be re-transmitted.

Figure 8:
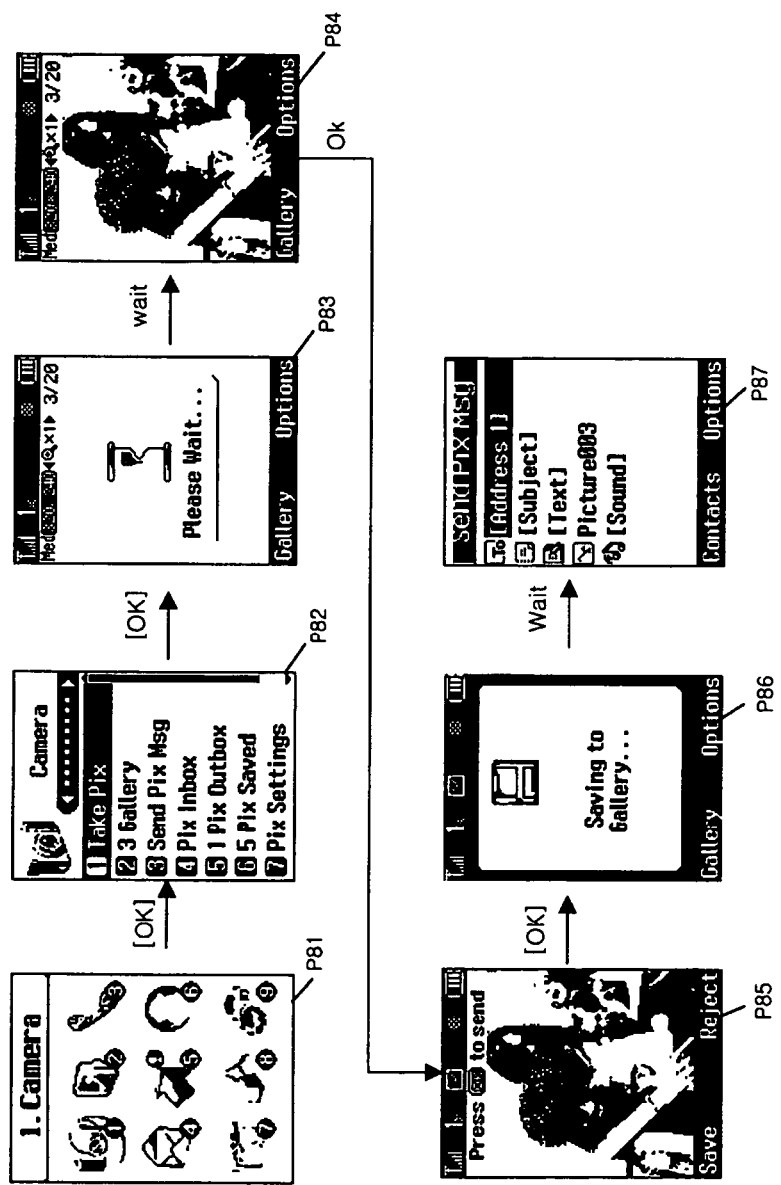
FIG. 8 is an exemplary view showing detailed images for switching to a multimedia message-creating screen while using a camera photographing function in accordance with the an embodiment of the present invention.

FIG. 8 is an exemplary view showing detailed images for switching to a multimedia message-creating screen while using a camera photographing function in accordance with the preferred embodiment of the present invention. By selecting the camera operating function from a main menu, indicated here by "1" displayed (P81), a menu concerning the operating functions of the camera photographing appears (P82) and may include several options for a photo and a multimedia message transmission. When the user selects the camera-photographing function "1 Take Pix," the camera photographing menu is switched to a camera-photographing mode (P83), wherein the integrated camera is operated to generate an image, which is subsequently displayed on the terminal's main screen (P84). If the user wishes to store the image in the internal memory of the terminal, manipulation of the terminal, such as by pressing the "OK" key, operates to store the image (P85). Further manipulation, such as by pressing the "OK" key again (P86), serves to switch to the multimedia menu function screen (P87), wherein the photograph image is indicated as attached.

An alternative embodiment of the present invention may further comprise the step of confirming the content that is inputted prior to returning to the menu field screen. This feature allows the user to amend the inputted content, such as text or the image attachment, prior to continuing to the next step in creating and sending a multimedia message.

Figure 9:
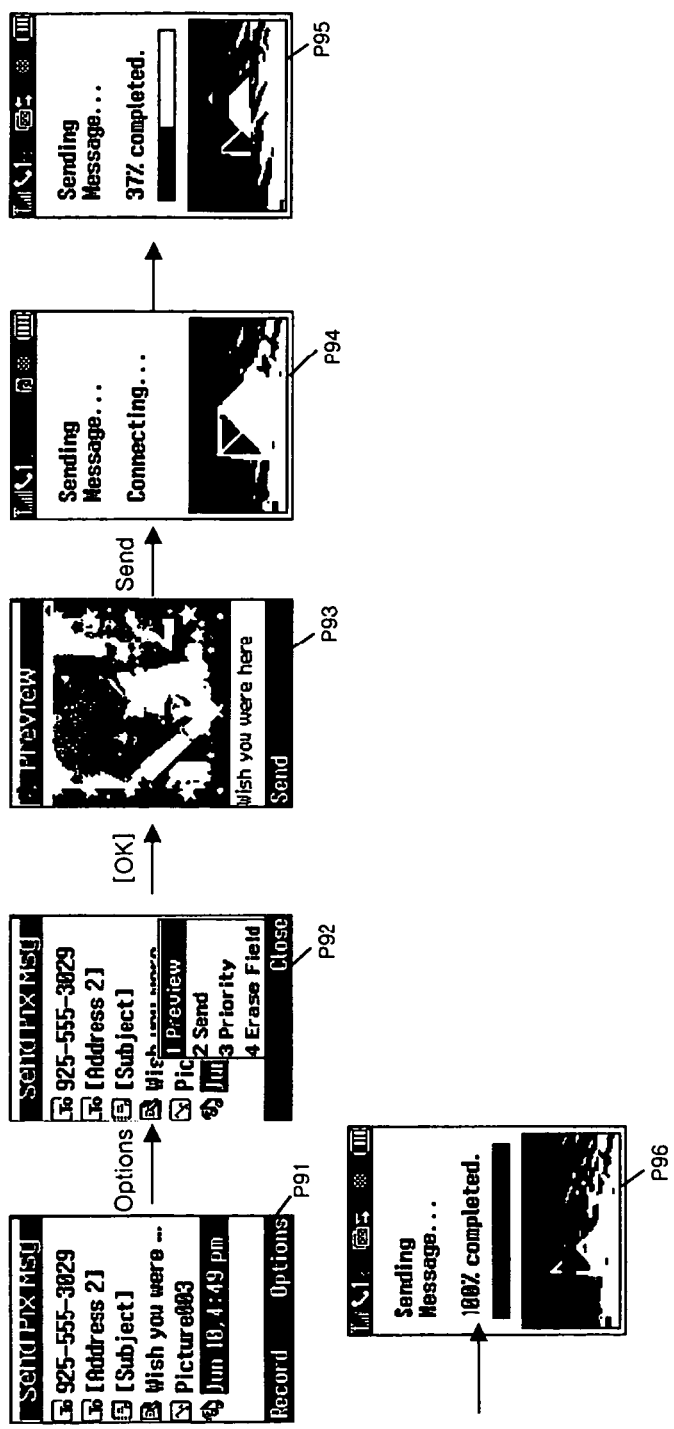
FIG. 9 is an exemplary view showing detailed images for finally checking the created multimedia message in accordance with an embodiment of the present invention.

FIG. 9 is an exemplary view showing detailed images for reviewing a completed multimedia message prior to transmission in accordance with an embodiment of the present invention. After inputting is completed with respect to the various menu function fields, the user may select the "Options" menu, which may be conveniently located on the main screen such as at the lower end in the multimedia message-creating or menu field screen (P91). A sub-menu of the "Options" menu is displayed (P92) thereafter. If the user selects "1 Preview" among the sub-menu options, the contents of the message, such as the attached photograph and/or sound, and the text of the multimedia message are displayed (P93). Subsequently, the user may opt to transmit the message after review by terminal manipulation, such as pressing the "Send" "smart-key" (P94, P95 and P96).

Figure 10:
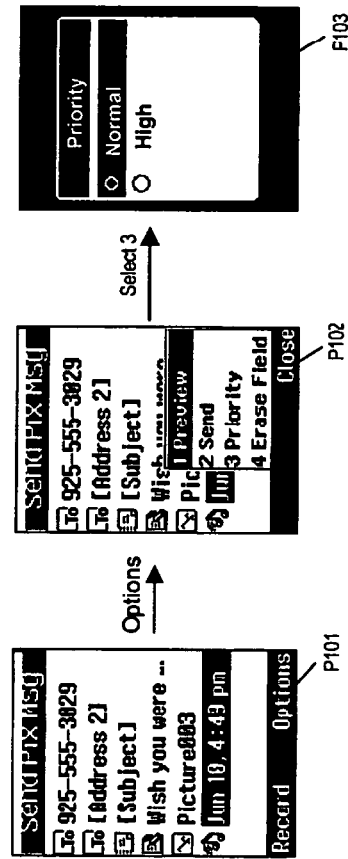
FIG. 10 is an exemplary view showing detailed images for selecting a transmission rate from an option menu of FIG. 9.

Alternatively, the user may select "3 Priority" among the sub-menu options, which is exemplified in FIG. 10 as detailed images for selecting a transmission rate from an option menu of FIG. 9. Accordingly, the user is allowed to select a normal transmission or a high transmission for the multimedia message (P103). Namely, the user can select a higher transmission rate of the multimedia message in the rate-selecting screen. With respect to both FIGS. 9 and 10, further manipulation of the terminal after selecting a sub-menu option, such as by pressing the "OK" key, operates to revert to the multimedia menu function screen (P91 and P101, respectively).

Figure 11:
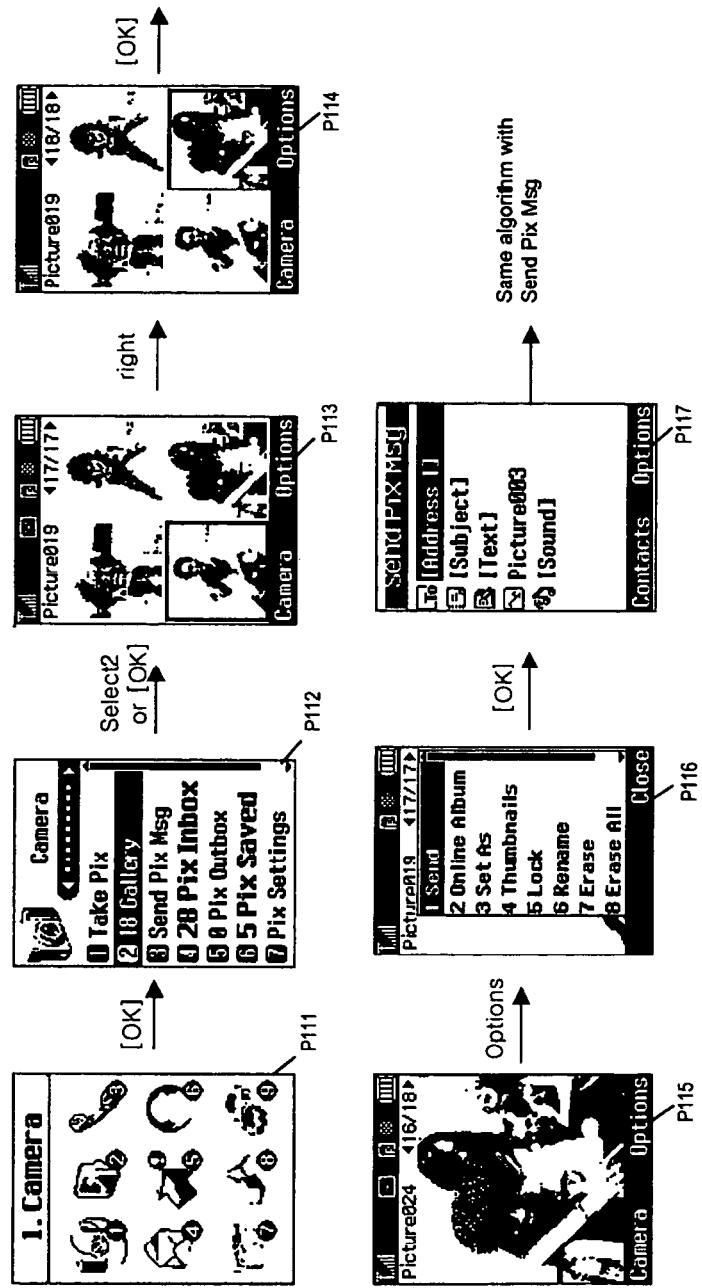
FIG. 11 is an exemplary view showing detailed images for switching to the multimedia message-creating screen while using a photo album function in accordance with an embodiment of the present invention.

FIG. 11 is an exemplary view showing detailed images for switching to the menu function screen while using a photo album function of the terminal. By selecting the camera operating function from a main menu, indicated here by "1" displayed (P111), a menu concerning the operating functions of the camera photographing appears (P112) and may include several options for a photo and a multimedia message transmission. When the user selects the "2 18 Gallery," for example, photographs stored in the mobile communication terminal are displayed in a form of a thumbnail list (P113 and P114). The user then may select one or more images from the thumbnail list (P115). Subsequently, the user, in selecting the "Options" menu, may opt one of various options to operate image management functions (P116), such as transmitting the image file. Accordingly, the corresponding screen is switched to the multimedia message-creating menu field screen (P117), wherein the selected photograph is shown as attached.

It will be apparent to those skilled in the art that various modifications and variations can be made in the present invention without departing from the spirit or scope of the invention. Therefore, the foregoing description of these embodiments of the present invention has been presented for the purposes of illustration and description. It is not intended to be exhaustive or to limit the invention to the precise form disclosed. Thus, it is intended that the present invention cover the modifications and variations of this invention provided they come within the scope of the appended claims and their equivalents. Preferred embodiments were shown in the context of receiving terminals in the form of mobile communication terminals.

What is claimed is:

1. A method for processing a multimedia message in a mobile terminal, the method comprising:
    initiating a message mode;
    displaying a menu for initiating a photograph mode in the message mode;
    receiving an input for initiating the photograph mode in the message mode;
    switching to the photograph mode in response to the received input;
    capturing an image to be transmitted with a multimedia message via a camera of the mobile terminal in the photograph mode;
    switching to the message mode, the captured image being attached to the multimedia message to be transmitted, wherein at least the attached image and an address field are displayed in the message mode;
    selecting the address field to receive at least one contact address;
    displaying a contact menu when the address field is selected;
    displaying a contact list comprising at least one contact when the displayed contact menu is selected;
    receiving an input for selecting a specific contact from the contact list;
    displaying contact information of the selected specific contact in response to the input for selecting the specific contact, the contact information comprising a plurality of contact addresses, the contact list not being displayed when the contact information of the selected specific contact is displayed;
    receiving an input for selecting at least one of the plurality of contact addresses; and
    transmitting the multimedia message with the attached image to the selected specific contact according to the selected at least one of the plurality of contact addresses.

2. The method of claim 1, further comprising:
    receiving user input for attaching the captured image to the multimedia message.

3. The method of claim 1, further comprising:
    determining whether a subject field of the multimedia message has received input; and
    displaying, in the subject field, at least a portion of text from message content received in a message body of the multimedia message upon determining that the subject field has not received input,
    wherein the portion of the text starts from a beginning of the text in the message body.

4. The method of claim 1, wherein in the message mode, a selecting bar is automatically re-positioned from a first field to a second field when an input is received in the first field.

5. The method of claim 1, further comprising:
    activating an input screen of the address field of the multimedia message and receiving a contact address via the input screen of the address field.

6. The method of claim 5, further comprising:
    automatically activating an input screen of a next field of the multimedia message after receiving the contact information via the input screen of the address field.

7. The method of claim 5, wherein the contact list is stored in the mobile terminal.

8. The method of claim 7, further comprising:
    displaying the selected at least one of the plurality of contact addresses in the address field.

9. The method of claim 1, wherein the plurality of contact addresses comprise at least a phone number and an email address of the selected specific contact.

10. The method of claim 9, wherein the plurality of contact addresses comprise at least two phone numbers or at least two e-mail addresses of the selected specific contact.

11. The method of claim 1, further comprising:
    displaying the captured image as a preview image before transmitting the multimedia message, allowing a user to amend the multimedia message.

12. A method for processing a multimedia message in a mobile terminal, the method comprising:
    initiating a message mode;
    displaying a menu for initiating a multimedia mode in the message mode;
    receiving an input for initiating recording in the multimedia mode;
    recording audio information in response to the input and generating an audio file comprising the recorded audio information to be transmitted with a message;
    attaching the audio file to the message;
    displaying at least an address field in the message mode;
    selecting the address field to receive at least one contact address;
    displaying a contact menu when the address field is selected;
    displaying a contact list comprising at least one contact when the displayed contact menu is selected;
    receiving an input for selecting a specific contact from the contact list;
    displaying contact information of the selected specific contact in response to the input for selecting the specific contact, the contact information comprising a plurality of contact addresses, the contact list not being displayed when the contact information of the selected specific contact is displayed;
    receiving an input for selecting at least one of the plurality of contact addresses; and
    transmitting the message with the attached audio file to the specific contact according to the selected at least one of the plurality of contact addresses.

13. The method of claim 12, wherein the audio information comprises a voice memo.

14. A mobile terminal comprising:
an input unit configured to receive an input for initiating a message mode or a photograph mode;
a display configured to display a screen related to the message mode in response to the input for initiating the message mode, the display further displaying a menu for initiating the photograph mode in the message mode; and
a camera configured to capture an image to be transmitted with a multimedia message upon entering the photograph mode from the message mode in response to the input for initiating the photograph mode,
wherein the mobile terminal is configured to:
switch to the message mode when the image is captured;
attach the captured image to the multimedia message;
displaying at least the attached image and an address field in the message mode;
select the address field to receive at least one contact address;
display a contact menu when the address field is selected;
display a contact list comprising at least one contact when the displayed contact menu is selected;
receive an input for selecting a specific contact from the contact list;
display contact information of the selected specific contact in response to the input for selecting the specific contact, the contact information comprising a plurality of contact addresses, the contact list not being displayed when the contact information of the selected specific contact is displayed;
receive an input for selecting at least one of the plurality of contact addresses; and
transmit the multimedia message with the attached image to the specific contact according to the selected at least one of the plurality of contact addresses.

15. The mobile terminal of claim 14, wherein the input unit is further configured to receive an input for attaching the captured image and the mobile terminal is further configured to attach the captured image to the multimedia message in response to the input for attaching the captured image.

16. The mobile terminal of claim 14, wherein the mobile terminal is further configured to:
determine whether a subject field of the multimedia message has received input; and
display, in the subject field, at least a portion of text from message content received in a message body of the multimedia message upon determining that the subject field has not received input,
wherein the portion of the text starts from a beginning of the text in the message body.

17. The mobile terminal of claim 14, wherein in the message mode, a selecting bar is automatically re-positioned from a first field to a second field when an input is received in the first field.

18. The mobile terminal of claim 14, wherein the mobile terminal is further configured to activate an input screen of the address field of the multimedia message and receive a contact address via the input screen of the address field.

19. The mobile terminal of claim 18, wherein the mobile terminal is further configured to automatically activate an input screen of a next field of the multimedia message after receiving the contact information via the input screen of the address field.

20. The mobile terminal of claim 18, wherein the contact list is stored in the mobile terminal.

21. The mobile terminal of claim 20, wherein the mobile terminal is further configured to display the selected at least one of the plurality of contact addresses in the address field.

22. The mobile terminal of claim 14, wherein the plurality of contact addresses comprise at least a phone number and an email address of the selected specific contact.

23. The mobile terminal of claim 22, wherein the plurality of contact addresses comprise at least two phone numbers or at least two e-mail addresses of the selected specific contact.

24. The mobile terminal of claim 14, wherein the mobile terminal is further configured to display, on the display, the captured image as a preview image before transmitting the multimedia message, allowing a user to amend the multimedia message.

25. A mobile terminal comprising:
an input unit configured to receive an input for initiating a message mode or a multimedia mode;
a display configured to display a screen related to the message mode in response to the input for initiating the message mode, the display further displaying a menu for initiating the multimedia mode in the message mode; and
a microphone configured to record audio information in the multimedia mode,
wherein the mobile terminal is configured to:
generate an audio file comprising the recorded audio information to be transmitted with a message;
switch to the message mode and attach the audio file to the message;
display at least an address field in the message mode;
select the address field to receive at least one contact address;
display a contact menu when the address field is selected;
display a contact list comprising at least one contact when the displayed contact menu is selected;
receive an input for selecting a specific contact from the contact list;
display contact information of the selected specific contact in response to the input for selecting the specific contact, the contact information comprising a plurality of contact addresses, the contact list not being displayed when the contact information of the selected specific contact is displayed;
receive an input for selecting at least one of the plurality of contact addresses; and
transmit the message with the attached audio file to the specific contact according to the selected at least one of the plurality of contact addresses.

26. The mobile terminal of claim 25, wherein the audio information comprises a voice memo.

27. The mobile terminal of claim 25, wherein in the message mode, a selecting bar is automatically re-positioned from a first field to a second field when an input is received in the first field.

28. The mobile terminal of claim 25, wherein the mobile terminal is further configured to activate an input screen of the address field of the message and receive a contact address via the input screen of the address field.

29. The mobile terminal of claim 28, wherein the mobile terminal is further configured to automatically activate an input screen of a next field of the message after receiving the contact information via the input screen of the address field.

30. The mobile terminal of claim 28, wherein the contact list is stored in the mobile terminal.

31. The mobile terminal of claim 30, wherein the mobile terminal is further configured to display the selected at least one of the plurality of contact addresses in the address field.

32. The mobile terminal of claim 25, wherein the plurality of contact addresses comprise at least a phone number and an email address of the selected specific contact.

33. The mobile terminal of claim 32, wherein the plurality of contact addresses comprise at least two phone numbers or at least two e-mail addresses of the selected specific contact.

34. The method of claim 12, wherein in the message mode, a selecting bar is automatically re-positioned from a first field to a second field when an input is received in the first field.

35. The method of claim 12, further comprising:
activating an input screen of the address field of the message and receiving a contact address via the input screen of the address field.

36. The method of claim 35, further comprising:
automatically activating an input screen of a next field of the message after receiving the contact information via the input screen of the address field.

37. The method of claim 35, wherein the contact list is stored in the mobile terminal.

38. The method of claim 37, further comprising:
displaying the selected at least one of the plurality of contact addresses in the address field.

39. The method of claim 12, wherein the plurality of contact addresses comprise at least a phone number and an email address of the selected specific contact.

40. The method of claim 39, wherein the plurality of contact addresses comprise at least two phone numbers or at least two e-mail addresses of the selected specific contact.

* * * * *